United States Patent
Saiki et al.

(10) Patent No.: US 9,850,352 B2
(45) Date of Patent: Dec. 26, 2017

(54) FINE CELLULOSE FIBER DISPERSION LIQUID AND MANUFACTURING METHOD THEREOF, CELLULOSE FILM AND LAMINATE BODY

(71) Applicant: TOPPAN PRINTING CO., LTD., Tokyo (JP)

(72) Inventors: Akiko Saiki, Tokyo (JP); Yumiko Oomori, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/342,510

(22) Filed: Nov. 3, 2016

(65) Prior Publication Data

US 2017/0073475 A1    Mar. 16, 2017

Related U.S. Application Data

(62) Division of application No. 13/583,126, filed as application No. PCT/JP2011/054988 on Mar. 3, 2011, now Pat. No. 9,534,091.

(30) Foreign Application Priority Data

| Mar. 9, 2010 | (JP) | 2010-051616 |
| Jul. 12, 2010 | (JP) | 2010-157571 |
| Jul. 12, 2010 | (JP) | 2010-157572 |
| Sep. 27, 2010 | (JP) | 2010-215966 |

(51) Int. Cl.

| C08J 3/03 | (2006.01) |
| C08J 3/05 | (2006.01) |
| C08J 3/11 | (2006.01) |
| C08J 5/18 | (2006.01) |
| C08B 15/04 | (2006.01) |
| C09D 101/04 | (2006.01) |
| C08L 1/04 | (2006.01) |
| C08B 15/02 | (2006.01) |
| C08J 3/09 | (2006.01) |

(52) U.S. Cl.
CPC ............ *C08J 3/03* (2013.01); *C08B 15/02* (2013.01); *C08B 15/04* (2013.01); *C08J 3/05* (2013.01); *C08J 3/095* (2013.01); *C08J 3/11* (2013.01); *C08J 5/18* (2013.01); *C08L 1/04* (2013.01); *C09D 101/04* (2013.01); *C08J 2301/04* (2013.01)

(58) Field of Classification Search
CPC ........................................................ C08J 3/03
See application file for complete search history.

(56) References Cited

U.S. PATENT DOCUMENTS

| 4,279,696 A | 7/1981 | Piersol | |
| 5,399,762 A * | 3/1995 | Walker | A01N 33/12 564/282 |
| 5,780,618 A | 7/1998 | Banker et al. | |
| 8,012,573 B2 * | 9/2011 | Kowata | C08B 11/02 264/442 |
| 8,992,728 B2 * | 3/2015 | Isogai | C08B 15/04 162/157.6 |
| 2010/0272980 A1 | 10/2010 | Kowata et al. | |

FOREIGN PATENT DOCUMENTS

| EP | 2022802 A1 | 2/2009 | |
| JP | 2001-279016 | 10/2001 | |
| JP | 2008-001728 | 1/2008 | |
| JP | 2008-266625 | 11/2008 | |
| JP | 2008-274525 | 11/2008 | |
| JP | 2009-057552 | 3/2009 | |
| JP | WO 2009069641 A1 * | 6/2009 | ............ C08B 15/04 |
| JP | 2009-155772 | 7/2009 | |
| JP | WO 2009081881 A1 * | 7/2009 | ............ C08B 11/02 |
| JP | 2009-263853 | 11/2009 | |
| JP | 2009-298972 | 12/2009 | |
| JP | 2009-299043 | 12/2009 | |
| JP | 2010-43144 | 2/2010 | |
| JP | 2010-059304 | 3/2010 | |
| JP | 2011-140738 | 7/2011 | |
| WO | 2009/069641 | 6/2009 | |
| WO | 2009/081881 | 7/2009 | |

OTHER PUBLICATIONS

International Search Report of Corresponding PCT Application PCT/JP2011/054988 dated Apr. 5, 2011.
Extended European Search Report dated Oct. 11, 2013 in corresponding European Application No. 11753271.3.
Chinese Office Action dated Jul. 22, 2014 in corresponding Chinese Patent Application No. 201180012862.0.
Araki et al., "Steric Stabilization of a Cellulose Microcrystal Suspension by Poly(ethylene glycol) Grafting", Langmuir, vol. 17, American Chemical Society, 2001, pp. 21-27.
"Evidence 5", Japan Analyst, vol. 22, 1973, pp. 1275-1281.
Scherer et al., Solubilty of cellulose in ammonia salt solutions, 1931.
Office Action for U.S. Appl. No. 13/583,126, dated Sep. 9, 2015.
Office Action for U.S. Appl. No. 13/583,126, dated Mar. 7, 2016.
Notice of Allowance for U.S. Appl. No. 13/583,126, dated Aug. 26, 2016.

(Continued)

*Primary Examiner* — Melvin C Mayes
*Assistant Examiner* — Stefanie Cohen

(57) ABSTRACT

A method of manufacturing a fine cellulose fiber dispersion liquid includes: an oxidation process in which a cellulose is subjected to an oxidation treatment to obtain an oxidized cellulose; and a dispersion process in which the oxidized cellulose obtained in the oxidation process is subjected to a dispersion treatment in a water-based medium in which a pH thereof is adjusted to 4 to 12 using either an ammonia water or an organic alkali to obtain the fine cellulose fiber dispersion liquid.

7 Claims, No Drawings

(56) References Cited

OTHER PUBLICATIONS

Corrected Notice of Allowability for U.S. Appl. No. 13/583,126, dated Sep. 30, 2016.
Korean Office Action dated Mar. 16, 2017 in corresponding Korean Patent Application No. 10-2012-7025404.
Tsuguyuki Saito et al., "Cellulose Nanofibers Prepared by TEMPO-Mediated Oxidation of Native Cellulose", Biomacromolecules, vol. 8, No. 8, American Chemical Society, Jul. 13, 2007, pp. 2485-2491.

* cited by examiner

FINE CELLULOSE FIBER DISPERSION LIQUID AND MANUFACTURING METHOD THEREOF, CELLULOSE FILM AND LAMINATE BODY

CROSS-REFERENCE TO RELATED APPLICATIONS

This application is a divisional of U.S. patent application Ser. No. 13/583,126 filed Sep. 6, 2012, now U.S. Pat. No. 9,534,091, which is a U.S. national stage application of 0 PCT/JP2011/054988 filed Mar. 3, 2011 and claims the foreign priority benefit of Japanese Application No. 2010-051616 filed Mar. 9, 2010, Japanese Application No. 2010-157571 filed Jul. 12, 2010, Japanese Application No. 2010-157572 filed Jul. 12, 2010, and Japanese Application No. 2010-215966 filed Sep. 27, 2010 in the Japanese Intellectual Property Office, the contents of all of which are incorporated herein 5 by reference.

TECHNICAL FIELD

The present invention relates to a technique referring to a cellulose fine fiber available as a functional film base material, a coating agent, or various additive agents, and relates to a dispersion liquid containing the cellulose fine fiber, a manufacturing method thereof, and a cellulose film and a laminate body obtained using the dispersion liquid containing the cellulose fine fiber.

BACKGROUND ART

In recent years, various natural polysaccharides, such as naturally occurring starch, cellulose, chitin/chitosan, and derivatives thereof, have attracted attention as biomass materials, relative to conventional petroleum-based resins, with increasing concerns about environmental issues. In addition, base materials formed by biodegradable resins, which are decomposable into water and carbon dioxide in the environment, also attract attention and are commercially available. Specific examples thereof include aliphatic polyesters yielded by microorganisms, various polysaccharides such as naturally-occurring starch, cellulose, chitin/chitosan, and derivatives thereof, biodegradable resins completely obtained by chemical synthesis, and polylactic acids obtained by polymerizing lactic acid derived from a starch or other raw materials.

Among the above, the cellulose, which is yielded in the largest quantity on earth, attracts attention as a functional material, because the cellulose is fibriform, has a high crystallinity, a high strength, and a low linear expansion coefficient, and is excellent in chemical stability and living body safety. Particularly, a fine cellulose fiber has been applied in a paper-strengthening agent, a filter aid, a food additive, or the like, and actively developed in recent years.

As a manufacturing method of the fine cellulose fiber, Patent Document 1, for example, discloses a fibrillating (pulverizing) method in which a cellulose suspension is sprayed under a high-pressure of 100 MPa or higher and thereby reducing the pressure.

Patent Document 2 discloses a method for obtaining a fine cellulose fiber by dispersing a cellulose in a medium, the cellulose having carboxyl groups obtained by partially oxidizing hydroxyl groups of the cellulose using a TEMPO (2,2,6,6-tetramethylpiperidinoxy radical) catalyst. The method makes it possible to obtain, with relative ease, the fine cellulose fiber having a type I cellulose crystalline structure by utilizing electronic repulsion of the carboxy groups having negative electrical charges.

Patent Document 3 disclose a method for obtaining an epoxy resin composite by adding a modified fine cellulose fiber to an epoxy resin, the modified fine cellulose fiber being obtained by treating a fine cellulose fiber with an organic onium compound, the fine cellulose fiber being obtained by dispersing a cellulose in a medium, the cellulose having carboxyl groups obtained by partially oxidizing hydroxyl groups of the cellulose using a TEMPO catalyst.

Patent Document 4 discloses a method for obtaining a gas barrier composite compact by coating and drying a gas barrier material on a PET film or a base material made of polylactic acid or the like, the gas barrier material containing a fine cellulose fiber having an average fiber diameter of 200 nm or less being prepared by dispersing in water an oxidized cellulose obtained by a TEMPO oxidation treatment.

CITATION LIST

Patent Documents

[Patent Document 1] Japanese Unexamined Patent Application, First Publication No. 2009-155772
[Patent Document 2] Japanese Unexamined Patent Application, First Publication No. 2008-1728
[Patent Document 3] Japanese Unexamined Patent Application, First Publication No. 2010-59304
[Patent Document 4] Japanese Unexamined Patent Application, First Publication No. 2009-57552

SUMMARY OF INVENTION

Technical Problem

Although Patent Document 1 discloses that a fine cellulose fiber having an average fiber diameter of 4 to 200 nm is obtainable, the fibrillation requires several treatments under an extremely high pressure, and limits available devices. In addition, it is difficult to efficiently obtain a homogeneous fine cellulose fiber by performing only a mechanical treatment. In addition, although the fine cellulose fiber is disclosed to be used by being combined with a synthetic polymer, the use of the fine cellulose fiber alone is not disclosed.

The carboxyl groups in the method disclosed in Patent Document 2 are associated with metal-ions, such as sodium ions, as counter ions thereof, as disclosed in examples thereof. In the case where the fine cellulose fiber is applied in an electronic component such as a semiconductor or a fuel cell, the presence of the metal-ions adversely affect on electronic properties thereof, and therefore is not preferable. In addition, although the fine cellulose fiber is disclosed to be cast to form a self-supporting film, there are problems in which the fine cellulose fiber film containing the metal-ions as the counter ions has a weak water resistance, and thereby being easily swollen with water, which decreases in strength thereof.

Patent Document 3 discloses that the method makes it possible to obtain a fine cellulose fiber easily dispersible in resin by performing the organic onium treatment in which metal-ions present as counter ions of the carboxyl groups are exchanged for organic onium ions. However, the fine cellulose fiber forms an aggregate during the ion-exchange process, which undermines the efficacy obtained by dispersing and pulverizing the cellulose at the process before the organic onium treatment. Even if the fine cellulose fiber once agglomerated is added in resin, the dispersion becomes insufficient and the fiber diameter becomes non-uniform, which makes it impossible to obtain a homogeneous composite material having both a high degree of strength and a high degree of transparency.

In addition, a film formed using a water-based dispersion liquid of a fine cellulose fiber, as disclosed in Patent Document 4, causes a problem in which the adhesiveness of the film to a base material such as a PET film is low due to an extremely hard form and low reactivity of the fine cellulose fiber. For example, there is a case in which interlayer separation between a base material and an undercoat occurs, when the base material is a film base material, particularly formed by a naturally occurring material, such as polylactic acid, and the undercoat of the base material is formed using a conventional water-based dispersion liquid of a fine cellulose fiber.

The above is caused because paper, polylactic acid, or other material is a natural product, which results in a chemical instability, bleeding of low-molecular-weight molecules, crystallization, or surface deterioration, in comparison with petroleum-derived synthetic resins, such as PET, and thereby lowering the wettability and the adhesiveness when coated as the base material. Accordingly, it is difficult to improve the adhesiveness between the film (undercoat) formed using the water-based dispersion liquid of a fine cellulose fiber and the base material formed by a naturally occurring material such as polylactic acid.

The present invention has been made in view of the above-mentioned problems, and it is an object thereof to provide a dispersion liquid containing a fine cellulose fiber, uniformly dispersible in an organic solvent or a resin, and applicable in electronic components.

In addition, it is an object thereof to provide a cellulose film and a laminate body, obtained using a fine cellulose fiber having an improved water resistance.

In addition, it is an object thereof to provide: a fine cellulose fiber dispersion liquid for forming a film as an undercoat of a film base material, particularly a base material formed from a naturally occurring material, such as polylactic acid, the adhesiveness of the film to the base material being improved; and a laminate body formed using the same.

Solution to Problem

In order to solve the above-mentioned problems, a first aspect of the invention defined is a fine cellulose fiber dispersion liquid characterized by containing at least: a fine cellulose fiber and either an ammonia or an organic alkali.

A second aspect of the invention is the fine cellulose fiber dispersion liquid according to the first aspect, characterized in that the organic alkali is either an amine or an organic onium compound having a hydroxide ion as a counter ion.

A third aspect of the invention is the fine cellulose fiber dispersion liquid according to the first aspect, characterized in that the organic alkali is a quaternary ammonium compound having a hydroxide ion as a counter ion.

A fourth aspect of the invention is the fine cellulose fiber dispersion liquid according to the first aspect, characterized in that the fine cellulose fiber is obtained by subjecting a cellulose to a dispersion treatment in a water-based medium while adjusting the pH to 4 to 12 using an ammonia water or the organic alkali.

A fifth aspect of the invention is the fine cellulose fiber dispersion liquid according to the fourth aspect, characterized in that the water-based medium is either water or a mixed liquid containing the water and an alcohol, and the alcohol is methanol, ethanol, 1-propanol, 2-propanol, 1-butanol, or 2-butanol.

A sixth aspect of the invention is the fine cellulose fiber dispersion liquid according to the first aspect, characterized by further containing a water-soluble organic solvent.

A seventh aspect of the invention is the fine cellulose fiber dispersion liquid according to the sixth aspect, characterized in that the water-soluble organic solvent is at least one organic solvent selected from the group consisting of methanol, ethanol, 2-propanol, acetone, methyl ethyl ketone, 1,4-dioxane, tetrahydrofuran, N,N-dimethylformamide, N,N-dimethylacetamide, dimethylsulfoxide, acetonitrile, and ethyl acetate.

An eighth aspect of the invention is the fine cellulose fiber dispersion liquid according to the seventh aspect, characterized in that an amount of the water-soluble organic solvent is at least 0.1% by weight, relative to a total amount of the fine cellulose fiber dispersion liquid.

A ninth aspect of the invention is the fine cellulose fiber dispersion liquid according to the first aspect, characterized by further comprising an additive agent containing a compound having a reactive functional group.

A tenth aspect of the invention is the fine cellulose fiber dispersion liquid according to the first aspect, characterized in that the fine cellulose fiber is an oxidized cellulose having a carboxyl group introduced by oxidation reaction, and a content of the carboxyl group is 0.1 mmol/g to 2 mmol/g.

An eleventh aspect of the invention is the fine cellulose fiber dispersion liquid according to the tenth aspect, characterized in that a number-average fiber diameter of the fine cellulose fiber is 0.003 µm to 0.050 µm.

A twelfth aspect is a cellulose film characterized by being formed by drying the fine cellulose fiber dispersion liquid of any one of the first through eleventh aspects.

A thirteenth aspect of the invention is a laminate body characterized in that a coating film is formed by coating the fine cellulose fiber dispersion liquid of any one of the first through eleventh aspects on at least one surface of a base material.

A fourteenth aspect of the invention is the laminate body according to the thirteenth aspect, characterized in that the coating film is an undercoat layer.

A fifteenth aspect of the invention is a manufacturing method of the fine cellulose fiber dispersion liquid, characterized by including: an oxidation process in which a cellulose is subjected to an oxidation treatment to obtain an oxidized cellulose; and a dispersion process in which the oxidized cellulose obtained in the oxidation process is subjected to a dispersion treatment in a water-based medium in which the pH thereof is adjusted to 4 to 12 using either an ammonia water or an organic alkali to obtain the fine cellulose fiber dispersion liquid.

A sixteenth aspect of the invention is the manufacturing method of the fine cellulose fiber dispersion liquid according to the fifteenth aspect, characterized in that the organic alkali is either an amine or an organic onium compound having a hydroxide ion as a counter ion.

A seventeenth aspect of the invention is the manufacturing method of the fine cellulose fiber dispersion liquid according to the fifteenth aspect, characterized in that the organic alkali is a quaternary ammonium compound having a hydroxide ion as a counter ion.

An eighteenth aspect of the invention is the manufacturing method of the fine cellulose fiber dispersion liquid according to the fifteenth aspect, characterized in that the water-based medium is either water or a mixed liquid containing water and an alcohol, and the alcohol is methanol, ethanol, 1-propanol, 2-propanol, 1-butanol, or 2-butanol.

A nineteenth aspect of the invention is the manufacturing method of the fine cellulose fiber dispersion liquid according to the fifteenth aspect, characterized in that the water-based medium contains a water-soluble organic solvent, and the water-soluble organic solvent is at least one organic solvent selected from the group consisting of methanol, ethanol, 2-propanol, acetone, methyl ethyl ketone, 1,4-dioxane, tetrahydrofuran, N,N-dimethylformamide, N,N-dimethylacetamide, dimethylsulfoxide, acetonitrile, and ethyl acetate.

A twentieth aspect of the invention is the manufacturing method of the fine cellulose fiber dispersion liquid according to the fifteenth aspect, characterized by further including a preparation process to be performed after the dispersion process by adding a water-soluble organic solvent to the obtained fine cellulose fiber dispersion liquid, the water-soluble organic solvent being at least one organic solvent selected from the group consisting of methanol, ethanol, 2-propanol, acetone, methyl ethyl ketone, 1,4-dioxane, tetrahydrofuran, N,N-dimethylformamide, N,N-dimethylacetamide, dimethylsulfoxide, acetonitrile, and ethyl acetate.

Advantageous Effects of Invention

The present invention allows to obtain a homogeneous fine cellulose fiber dispersion liquid by effectively utilizing a cellulose, which is a natural resource having a biodegradability and causing a low environmental load in a waste treatment process.

The fine cellulose fiber dispersion liquid obtained according to the present invention makes it possible to produce a cellulose film having a high heat resistance, a low linear expansion coefficient, a high elastic modulus, a high strength, a high transparency, and an improved water resistance. The cellulose film may be applied in a packing material (particularly, gas barrier material), a structure, a display part, or the like. In addition, the cellulose film may be preferably applied in an electronic component having no preference for contamination of metal-ions such as a sodium ion, because the cellulose film is prepared without using any inorganic alkalis which are conventionally used in a dispersion treatment process. In addition, the fine cellulose fiber dispersion liquid may be used as a coating agent or an additive agent to make uniform complexes with various resins.

In addition, a fine cellulose fiber dispersion liquid which allows to form a film as an undercoat of a film base material, particularly a base material formed from a naturally occurring material such as polylactic acid, the adhesiveness of the film to the base material being improved, is provided according to the present invention. In other words, it is possible to form various types of a functional material coating film, such as a gas barrier layer or a water vapor barrier layer, on the base material with favorable coatability and adhesiveness to provide a laminate body having the functional material coating film.

DESCRIPTION OF EMBODIMENTS

In the following, an aspect of a fine cellulose fiber dispersion liquid according to the present invention will be explained.

The fine cellulose fiber dispersion liquid of the aspect is prepared by the following method, for example. First, a carboxyl group is introduced into a cellulose used as a raw material.

(Raw Material)

A naturally occurring cellulose having a type I cellulose crystalline structure may be used as a raw material. Examples of the naturally occurring cellulose as a raw material include a wood pulp, a non-wood pulp, a cotton cellulose, a bacterial cellulose, and a hoya cellulose.

(Oxidation Process)

There are no particular limitations on a method for oxidizing the cellulose, and the method may be arbitrarily selected depending on the intended purpose thereof, provided that a carboxyl group is introduced into the cellulose, used as a raw material, by the method. For example, the method may be arbitrarily selected from conventionally-known methods for oxidizing a hydroxyl group into a carboxylic acid through an aldehyde. Among the above, a method in which a nitroxy radical derivative is used as a catalyst and a hypohalous acid salt, a halous acid salt, or the like, is used as a cooxidant is preferable. Particularly, a TEMPO (2,2,6,6-tetramethylpiperidinoxy radical) oxidation method in which an oxidation is carried out using TEMPO as a catalyst in a water-based medium containing both sodium hypochlorite and sodium bromide under an alkaline condition, preferably within the pH range of 9 to 11, is preferable from standpoints of the easiness to obtain reagents, cost, reaction stability, selectivity to microfibril surface, and efficient introduction of a carboxyl group. It is preferable in the TEMPO oxidation method that the pH in the system be maintained at a constant level by adding an alkali aqueous solution, as needed, because alkalis are consumed as the reaction proceeds.

In the TEMPO oxidation, a hydroxyl group at the 6-position of a pyranose ring (glucose) of a cellulose molecule is selectively oxidized, as a result of which a carboxyl group is introduced via an aldehyde group. In the TEMPO oxidation in which a natural cellulose is used, only the surface of crystalline microfibrils, which are constituent units of the cellulose, is oxidized, and the inside of the crystals is not oxidized. Accordingly, it is possible to obtain a fine cellulose fiber while maintaining a type I cellulose crystalline structure, and the thus obtained fine cellulose fiber has a high heat resistance, a low linear expansion coefficient, a high elastic modulus, a high strength, a gas barrier property, and the like.

Commercially available reagents may be easily used for the TEMPO oxidation. The reaction temperature is preferably 0° C. to 60° C., and an adequate amount of the carboxyl group can be introduced for approximately 1 to 12 hours to obtain a fine fiber exhibiting a dispersibility.

The TEMPO and the sodium bromide may be used in an amount sufficient to serve as catalysts at the reaction, and may be recovered after the reaction. A theoretical by-product produced in the above-mentioned reaction system is only sodium chloride, and therefore a process for treating waste liquid is easy and the environmental load is small.

The content of the carboxyl group may be adjusted by arbitrarily setting conditions of the TEMPO oxidation. Since cellulose fibers disperse in a water-based medium due to the action of the electronic repulsion force of the carboxyl groups, an extremely small content of the carboxyl group: prevents the cellulose fibers from stably dispersing in the water-based medium; makes it difficult for the cellulose fiber to form uniform complexes with various resins when a dispersion liquid thereof is used as a coating agent or an additive agent; and deteriorates a coatability and a gas barrier property thereof. An extremely large content of the carboxyl group increases the affinity for water, which lowers the water resistance or the crystallinity, and thereby weakening the strength and deteriorating the gas barrier property.

In view of the above-mentioned matters, the content of the carboxyl group is preferably 0.1 mmol/g to 3.5 mmol/g, more preferably 0.1 mmol/g to 2 mmol/g, and even more preferably 0.6 mmol/g to 2 mmol/g. In the process of introducing a carboxyl group, an aldehyde group is formed as an intermediate of the oxidation reaction, and the aldehyde group remains in the final product. Since an extremely large content of the aldehyde group lowers the dispersibility in the water-based medium, the content of the aldehyde group is preferably 0.01 mmol/g to 0.3 mmol/g.

The oxidation reaction is ended by adding an excess amount of another alcohol to completely consume the cooxidant in the system. It is desirable to use a low-molecular weight alcohol, such as methanol, ethanol, or propanol, as the alcohol to be added, in order to promptly end the reaction. Among these, ethanol is preferable, taking into account the safety and by-products produced by oxidation.

(Recovery of Oxidized Cellulose)

After the end of the oxidation reaction, the resulting oxidized cellulose may be recovered from the reaction liquid by filtration. In the oxidized cellulose obtained after the end of the reaction, the carboxyl group forms a salt with a metal-ion, as a counter ion thereof, derived from the cooxidant or an inorganic alkali for adjusting the pH. Examples of the recovery method include: a method in which filtration and separation are performed while keeping the carboxyl group forming the salt; a method in which the pH of the reaction liquid is adjusted to 3 or less by adding an acid thereto to obtain a carboxylic acid, followed by performing filtration and separation; and a method in which an organic solvent is added to form an agglomerate, followed by performing filtration and separation. Since the majority of the counter ion (metal-ion) in the oxidized cellulose is removed once the salt is converted to a carboxylic acid, filtration and separation are performed after the conversion to the carboxylic acid. The method in which the recovery is performed after the conversion to the carboxylic acid is preferable taking into account the handling ability, the yield, and the waste liquid treatment. The conversion to the carboxylic acid allows for an efficient washing with water, a decreased metal-ion content, and a reduced number of washing steps.

The metal-ion content in the oxidized cellulose may be determined by various analysis methods, and, for example, may be easily determined by an EPMA method using an electron beam micro analyzer, or an elemental analysis of a fluorescent X-ray analysis method. Whereas the metal-ion content ratio is 5% by weight or more when recovered by performing filtration and separation with keeping the salt formed, the metal-ion content ratio is 1% by weight or less when recovered by performing filtration and separation after the conversion to a carboxylic acid.

(Washing)

The recovered oxidized cellulose may be purified by repeating washing, and thereby removing residues such as catalysts, salts, and ions. At the washing steps, water is preferably used as a washing liquid, and water-washing performed after washing under an acidic condition in which the pH is adjusted to 3 or less, more preferably 1.8 or less, using a hydrochloric acid, makes the metal-ion content less than or equal to the minimum detectable quantity by the above-mentioned analysis method. The washing step performed under the acidic condition may be repeatedly performed in order to further reduce the remaining metal-ion content. It is preferable that the water-washing step be repeatedly performed, because the presence of remaining salts and the like in the cellulosed makes dispersion difficult at a dispersion process mentioned below.

Next, processes for preparing a fine cellulose fiber dispersion liquid using the oxidized cellulose obtained by the above-mentioned procedures will be explained.

(Dispersion Process)

First, the washed oxidized cellulose is immersed in a water-based medium as a dispersion medium in a pulverizing process of the oxidized cellulose. It is preferable in the process that water or a mixed liquid containing water and an alcohol be used as the water-based medium. Examples of the alcohol to be used include methanol, ethanol, 1-propanol, 2-propanol, 1-butanol, and 2-butanol. At least one type of the organic solvents may be mixed.

In the process, an existence of the alcohol-based substance in the medium allows for a further homogeneous dispersion when an organic solvent is further added after a dispersion process. In addition, it is possible to improve the temporal stability of a dispersion liquid. Although an additive amount of the alcohol is not particularly limited, the additive amount is preferably 1% to 60%, more preferably 1% to 50%, and even more preferably 1% to 20%, with respect to an amount of water. When the alcohol is contained, the coatability of the dispersion liquid used as a coating agent or an additive agent is improved, and the drying energy thereof is reduced in comparison with that of water alone.

In the process, the pH of the liquid for immersion is, for example, 4 or less. The oxidized cellulose is insoluble in the water-based medium, and forms a heterogeneous suspension when immersed.

A dispersion medium consisting of an alcohol, free from water, may also be used to prepare the fine cellulose fiber dispersion liquid.

The water-based medium may contain, in addition to either water or the mixed liquid of water and the alcohol, a water-soluble organic solvent which can be uniformly mixed with water. Examples of the water-soluble organic solvent to be used include: the above-mentioned alcohols, such as methanol, ethanol, and 2-propanol (IPA); ketones such as acetone, and methyl ethyl ketone (MEK); ethers such as 1,4-dioxane and tetrahydrofuran (THF); N,N-dimethylformamide (DMF), N,N-dimethylacetamide (DMAc), dimethylsulfoxide (DMSO), acetonitrile, and ethyl acetate. These may be used alone or as a mix solvent of at least two types thereof. In the case where a mixed solvent of water and the water-soluble organic solvent is used as the water-based medium, the mixing ratio thereof may be arbitrarily determined taking into account the type of the water-soluble organic solvent, the affinity between water and the water-soluble organic solvent, and the like.

Next, the pH of the suspension is adjusted to 4 to 12 using an alkali. In particular, the pH is adjusted to an alkaline region of 7 to 12 to form a carboxylic acid salt. As a result, an electronic repulsion between the carboxyl groups is readily generated, and thereby the dispersibility is improved and it becomes easy to obtain the fine cellulose fiber. Although a mechanical dispersion treatment makes it possible to pulverize the cellulose into fine fibers even at the pH of less than 4, the dispersion treatment requires a further long-term and high-energy, the thus obtained fiber has a fiber diameter larger than that of the present invention, and the thus obtained fine cellulose fiber dispersion liquid has a poor transparency.

An ammonia water or an organic alkali is used as the alkali to adjust the pH in order to prevent the fine cellulose fiber dispersion liquid from accompanying metal-ions. An amount of the alkali added, which is less than or equal to the content of the carboxyl group in molar ratio, is sufficient, and an even amount of the alkali added, which is less than or equal to two-thirds of the content of the carboxyl group, allows for a dispersion. It is not preferable that the amount of the alkali added be extremely large, because coloration of the dispersion liquid occurs. Examples of the organic alkali include: various amines, such as aliphatic amines, aromatic amines, and diamines; and organic onium compounds having a hydroxide ion as a counter ion, such as: ammonium hydroxide compounds represented by $NR_4OH$ (in which R represents an alkyl group, a benzyl group, a phenyl group, or a hydroxyalkyl group, and four R may be the same or different from each other), such as tetramethyl ammonium hydroxide, tetraethyl ammonium hydroxide, tetra-n-butyl ammonium hydroxide, benzyltrimethyl ammonium hydroxide, 2-hydroxyethyl trimethyl ammonium hydroxide; phosphonium hydroxide compounds such as tetraethyl phosphonium hydroxide; oxonium hydroxide compounds, and sulfonium hydroxide compounds. In the case where the organic alkali is used, the fiber may be pulverized, without depending on the type of the alkali, by subjecting to the dispersion treatment at a level less than or equal to that to be performed using an inorganic alkali. In particular, in the case where the organic alkali is used, the bulkiness thereof promotes the dispersion due to the microfibril repulsion of the cellulose. In addition, there is a case where the viscosity of the dispersion liquid is lowered, which allows for an efficient dispersion.

The fine cellulose fiber obtained using the organic alkali improves the water resistance of a cellulose film and a cellulose coating film mentioned below due to the hydrophobicity of the organic alkali.

In addition, even if an alcohol is used as a water-based medium, the use of the organic alkali makes it possible to prepare a uniformly-dispersed fine cellulose fiber dispersion liquid due to the high affinity of the organic alkali for the alcohol. In addition, the use of the organic alkali is effective, because such a use prevents the dispersed fine cellulose fiber dispersion liquid from agglomerating, getting clouded, and becoming heterogeneous, even if a water-soluble organic solvent mentioned below is added to the fine cellulose fiber dispersion liquid subjected to the dispersion treatment in the water-based medium.

In addition, in the case where the organic alkali is used as an alkali, the dispersion treatment requires less energy and less time, in comparison with the case where an inorganic alkali having a metal-ion as a counter ion is used as an alkali. In addition, the transparency of the fine cellulose fiber dispersion liquid finally obtained can be improved. The reason for the above is considered to be that the use of the organic alkali has a larger effect of separating the fine cellulose fibers from each other in the dispersion medium due to a larger ion size of a counter ion of the organic alkali than that of the other.

In addition, the fine cellulose fiber dispersion liquid generally becomes gelatinous and the viscosity thereof increases as the concentration thereof increases, and, therefore, a dispersion treatment requires a large amount of energy, which makes the dispersion treatment difficult. In comparison with the case in which an inorganic alkali is used, the use of an organic alkali is favorable because both the viscosity and the thixotropy of the dispersion liquid decrease, and both dispersion treatment and coating treatment at a coating process mentioned below become easy. Although the fine cellulose fiber dispersion liquid generally becomes gelatinous and the viscosity thereof increases as the concentration thereof increases, and, therefore, a large amount of energy is required at the dispersion treatment and the dispersion treatment becomes difficult, the viscosity of the dispersion liquid is lowered by using an organic alkali, and the dispersion treatment becomes easy. In addition, the use of the organic alkali with a water-soluble organic solvent mentioned below makes it possible to control the viscosity property of the dispersion liquid, and thereby improving the coatability thereof.

The thus prepared fine cellulose fiber dispersion liquid contains: a fine cellulose fiber having a carboxyl group; and either an amine or an organic onium ion derived from the organic alkali. The fine cellulose fiber dispersion liquid is isolated, dried, filtered, and separated, in accordance with conventionally-known procedures, to obtain a fine cellulose fiber having a carboxyl group with either an amine or an organic onium ion as a counter ion.

Examples of the organic onium ion include onium ions, cations of the above-mentioned organic alkali, such as a quaternary ammonium ion, a quaternary phosphonium ion, a tertiary oxonium ion, and a tertiary sulfonium ion. In the case where a phosphonium ion is the counter ion, the heat resistance is improved, and the compatibility between the onium ion and a resin can be regulated.

On the other hand, the use of an inorganic alkali such as sodium hydroxide makes the pulverization in the solvent or mixing with the solvent difficult. In the case where a water-soluble organic solvent is added to the fine cellulose fiber dispersion liquid prepared using the inorganic alkali containing a metal-ion, the dispersed fine cellulose fibers are agglomerated, and therefore the fine cellulose fiber dispersion liquid is agglomerated, gets clouded, and becomes heterogeneous. The fact becomes a problem to deteriorate the coatability of the dispersion liquid used as a coating agent, and lower the mechanical strength, the transparency, and the barrier properties, of a formed film or laminated material, when the water-soluble organic solvent mentioned below is added to obtain a predetermined viscosity or solid content concentration of the fine cellulose fiber dispersion liquid for forming the film or the laminated material using the fine cellulose fiber dispersion liquid.

Conventionally-known various dispersion methods may be adopted to perform dispersion treatment in the water-based medium. Examples thereof include treatment with a homomixer, treatment with a mixer equipped with a rotary blade, treatment with a high-pressure homogenizer, treatment with an ultrahigh-pressure homogenizer, treatment with an ultrasonic homogenizer, treatment with a nanogenizer, treatment with a disk refiner, treatment with a conical refiner, treatment with a double disk refiner, treatment with a grinder, treatment with a ball mill, and underwater opposite treatment. Among the above-mentioned treatments, the treatment with a mixer equipped with a rotary blade, the treatment with a high-pressure homogenizer, the treatment with an ultrahigh-pressure homogenizer, and the treatment with an ultrasonic homogenizer are preferable from the standpoint of pulverizing efficiency. At least two of the treatment methods may be adopted to perform dispersion.

The above-mentioned dispersion treatment makes the suspension a visually homogeneous and transparent dispersion liquid. The oxidized cellulose is pulverized by the dispersion treatment to be a fine cellulose fiber.

The fine cellulose fiber after the dispersion treatment preferably has a number-average fiber diameter (width in a short axis direction of the fiber) of 0.001 μm to 0.200 μm, more preferably 0.001 μm to 0.050 μm. The fiber diameter of the fine cellulose fiber may be determined using a scanning electron microscope (SEM) or an atomic force microscope (AFM). If the dispersion is insufficient and heterogeneous and therefore cellulose fibers having a large fiber diameter (a number-average fiber diameter of which exceeds 0.200 μm) are contained, problems occur in which: the coatability of the dispersion liquid containing the fine cellulose fiber deteriorates; and the transparency, the smoothness, and the gas barrier property of formed film significantly deteriorate. In addition, uniform dispersion becomes difficult when the dispersion liquid is mixed with other materials as an additive agent.

In the case where the organic alkali is used as an alkali, it is preferable that the transmittance of the obtained fine cellulose fiber dispersion liquid be at least 90% when the solid content concentration thereof is 0.5%. If the transmittance of the obtained fine cellulose fiber dispersion liquid is at least 90%, the fine cellulose fiber dispersion liquid can form a cellulose film or a laminated material having a sufficient transparency. In particular, it is more preferable that the transmittance of the obtained fine cellulose fiber dispersion liquid be at least 97% when the solid content concentration thereof is 0.5%.

(Preparation Process)

A water-soluble organic solvent may be further added to the fine cellulose fiber dispersion liquid obtained by dispersion treatment. The water-soluble organic solvent to be added to the fine cellulose fiber dispersion liquid may be any organic solvent which is soluble in water, and examples thereof include the above-mentioned water-soluble organic solvents to be contained in the water-based medium in the dispersion process, such as: alcohols such as methanol, ethanol, and 2-propanol; ketones such as acetone, and methyl ethyl ketone (MEK); ethers such as 1,4-dioxane, and tetrahydrofuran (THF); N,N-dimethylformamide (DMF), N,N-dimethylacetamide (DMAc), dimethylsulfoxide (DMSO), acetonitrile, and ethyl acetate. The process is useful to form a composite material with a resin, because the solubility of the resin is enhanced.

The above-mentioned water-soluble organic solvents may be used alone, or in combination of at least two types thereof. In addition, the above-mentioned water-soluble organic solvent may be used in combination with water.

Although an amount of the water-soluble organic solvent to be added may be determined taking into account the type thereof, it is preferable that the minimum amount thereof be 0.1% by weight, and the maximum amount thereof be 60% by weight, with respect to the total amount of the fine cellulose fiber dispersion liquid. However, in the case where the water-soluble organic solvent has a relatively-large affinity for water, such as alcohols or acetone, the maximum additive amount thereof may be, for example, approximately 99.9% by weight, as needed. On the other hand, in the case where the water-soluble organic solvent has a relatively-small affinity for water, the maximum additive amount thereof may be approximately 50% by weight, as needed.

If the additive amount of the water-soluble organic solvent is less than 0.1% by weight, improvements in: the solubility of the resin; the drying efficiency mentioned below; and the coatability of the fine cellulose fiber dispersion liquid are insufficient. On the other hand, the additive amount of the water-soluble organic solvent is preferably at least 10% by weight, more preferably at least 30% by weight, because improvements in: the solubility of the resin; the drying efficiency mentioned below; and the coatability of the fine cellulose fiber dispersion liquid are sufficient.

In the case where multiple types of the water-soluble organic solvent are used in combination or both the water-soluble organic solvent and water are used in combination, the mixing ratio thereof may be arbitrarily determined taking into account the solid content concentration or the viscosity of the fine cellulose fiber dispersion liquid, or properties required for a film or a laminated material formed using the fine cellulose fiber dispersion liquid.

As mentioned above, the water-soluble organic solvent may be used as the dispersion medium, that is, the water-based medium, for the oxidized cellulose at the dispersion process or may be used as an organic solvent to be added to the fine cellulose fiber dispersion liquid obtained by the dispersion process without being used as the water-based medium.

Specific examples of the process include: (1) a method in which the oxidized cellulose suspension is subjected to the dispersion treatment using water alone as the water-based medium to obtain the fine cellulose fiber dispersion liquid, followed by adding the water-soluble organic solvent to the obtained fine cellulose fiber dispersion liquid; and (2) a method in which the oxidized cellulose suspension is subjected to the dispersion treatment using a mixed solvent composed of water and a water-soluble organic solvent as the water-based medium to obtain the fine cellulose fiber dispersion liquid. In the method (2), the water-soluble organic solvent which is the same or different from one used as the water-based medium may be added to the obtained fine cellulose fiber dispersion liquid. The methods (1) and (2) are one aspect of the present invention, and the present invention is not limited to the aspect.

The addition of the water-soluble organic solvent to the fine cellulose fiber dispersion liquid obtained by performing the dispersion treatment reduces the surface tension of the fine cellulose fiber dispersion liquid and improves the wettability with respect to the base material. In particular, a solvent having a high solubility of the base material is preferably used as the water-soluble organic solvent. Although, in the case where a polylactic acid is used as the base material, the surface of the base material after coating is slightly eroded, and thereby improving the adhesiveness, for example, poorly-soluble methanol, ethanol, 2-propanol (IPA), or the like, is preferable, and acetone, methyl ethyl ketone (MEK), tetrahydrofuran (THF), ethyl acetate, or the like, is more preferable. The adhesion mechanism is considered to be that the organic solvent erodes the surface of the base material, and the coating liquid of the fine cellulose fiber dispersion liquid enters therein to adhere thereto.

The fine cellulose fiber exhibits effects of suppressing the thermal shrinkage of the base material when coated on the base material as a coating film, due to the high crystallinity and the small linear expansion coefficient thereof. In the case where a laminate body mentioned below is formed, although the difference in the linear expansion coefficient between a base material and a functional material causes a problem of boundary separation therebetween when heating at a drying or forming step, the formation of the coating film containing the fine cellulose fiber on the base material suppresses shrinkage of the base material, and thereby preventing separation from the base material.

A compound having a reactive functional group, such as an amino group, an epoxy group, a hydroxyl group, a carbodiimide group, a polyethylenimine, an isocyanate, an alkoxy group, a silanol group, or an oxazoline group, may be added as an additive agent to the fine cellulose fiber dispersion liquid. The additive agent reacts with a hydroxyl group, a carboxyl group, or an aldehyde group, in the oxidized cellulose, and thereby exhibiting effects of improving various properties of the coating film, particularly, the film strength thereof, the water resistance thereof, the moisture resistance thereof, or the adhesiveness thereof to the base material.

Examples of the compound having a silanol group include silane coupling agents, alkoxysilanes, and hydrolysates thereof. The silane coupling agents are silane compounds having at least two hydrolyzable groups binding to a silicon atom.

The hydrolyzable groups are groups hydrolysable to hydroxyl groups. When hydrolyzation occurs, a silanol group (Si—OH) is generated in the silane coupling agent.

Examples of the hydrolyzable group include an alkoxy group, an acetoxy group, and a chlorine atom, and an alkoxy group is preferable among the above. That is, an alkoxysilane is preferable as the silane coupling agent. An alkyl group of the alkoxy group is preferably an alkyl group having 1 to 5 carbon atoms, more preferably a methyl group or an ethyl group, and particularly preferably an ethyl group.

In the case where the silane coupling agent has two or three hydrolyzable groups, it is preferable that the silane coupling agent further has another reactive functional group.

As the reactive functional group, ones which can form a chemical bond (covalent bond) or interact with each other (form a hydrogen bond) due to the reaction with a functional group (such as a carboxy group or a hydroxyl group) present on the cellulose nanofiber surface or the base material surface may be arbitrarily selected from functional groups of organic groups binding to a Si atom of generally-used silane coupling agents. Specific examples thereof include a vinyl group, an epoxy group, a methacryloxy group, an acryloxy group, an amino group, an ureido group, a mercapto group, a chlorine atom, and an isocyanate group. Among the above, an epoxy group, a methacryloxy group, an acryloxy group, and an amino group are preferable, and an amino group is particularly preferable.

In the case where the reactive compound, particularly the compound having an alkoxy group and a silanol group, is used to enhance the effects of improving various properties of the coating film, particularly, the film strength thereof, the water resistance thereof, the moisture resistance thereof, or the adhesiveness thereof to the base material, homogeneous mixing is important. In particular, the fine cellulose fiber dispersion liquid according to the present invention is preferable in terms of the low viscosity thereof, the mixability thereof with the alcohol, the absence of metal-ions such as a sodium ion, and ability to suppress reactive agglomeration and heterogeneous reaction. In addition, an inorganic layered compound may be added as an additive agent.

The inorganic layered compound is a crystalline inorganic compound having a layered structure, and examples thereof include clay minerals as typified by the kaolinite family, the smectite family, the mica family, and the like. The inorganic layered compound may be arbitrarily selected depending upon required properties thereof without being particularly limited on the types thereof, the synthetic or natural origin thereof, the production area thereof, the particle diameter thereof, the aspect ratio thereof, or the like. General examples of the inorganic layered compound of the smectite family include montmorillonite, hectorite, saponite, and the like. Among the above, montmorillonite is preferable in terms of the stability thereof in the coating liquid, the coatability thereof, and the like. The addition of the inorganic layered compound particularly improves the gas barrier property.

The obtained fine cellulose fiber may be mixed with a resin such as an epoxy resin, a polyester resin, an acrylic resin, an urethane resin, a polyolefin resin, a polyimide resin, or a polyamide resin, to prepare a composite composition. In addition, the composite composition may be used to prepare a composite material which is homogeneous and transparent. The composite composition effects on improving the mechanical strength of the obtained composite material, lowering the linear expansion coefficient thereof, and enhancing the elastic modulus thereof.

In particular, the use of the above-mentioned water-based resin makes it possible to prepare a more homogeneous composite composition which can form a composite material: having a high fiber dispersibility; and exhibiting improved effects mentioned above. The use of the above-mentioned emulsion-based resin to form a composite composition makes it possible to lower the drying energy, improve the dispersibility and stability of the emulsion, prevent the re-agglomeration/precipitation, and form a complex with various resins.

The composite composition may contain, as needed, various additive agents, such as a silane coupling agent, a leveling agent, an antifoamer, an inorganic particle, an organic particle, a lubricant agent, an antistatic agent, an ultraviolet absorber, a pigment, a dye, a light stabilizer, an antioxidant, a plasticizer, a flame retardant, a dispersing agent, a foaming agent, or a filler, in addition to the fine cellulose fiber and the resin.

Examples of the composite material prepared using the composite composition include a dye, an ink, a transparent base material, a film base material, a compact, a container, a chassis, and an electronic component. Among the above, the preferable use of the composite material prepared using the composite composition is a transparent base material, taking into account an improved mechanical strength, lowered linear expansion coefficient, and enhanced elastic modulus, which are caused by using the composite composition.

The fine cellulose fiber dispersion liquid according to the present invention allows for a uniform dispersion to form a complex without causing agglomeration or precipitation even if the fine cellulose fiber dispersion liquid is added to a solvent-free or solvent-based resin instead of the water-based resin.

Next, a cellulose film and a laminate body, prepared using the fine cellulose fiber dispersion liquid according to the present invention, will be explained.

(Cellulose Film)

The fine cellulose fiber dispersion liquid according to the present invention may be used as a material for forming a self-supporting film of a cellulose film by a method in which a cast process is performed or the fine cellulose fiber dispersion liquid is coated or extruded on the base material to form a film, followed by drying and separating the film. Since the fine cellulose fiber dispersion liquid according to the present invention contains the organic alkali, it is possible to lower the viscosity of the fine cellulose fiber dispersion liquid and increase the solid content concentration thereof to at least 2%. Thus, it is possible to use the fine cellulose fiber dispersion liquid in highly-concentrated form, and therefore a thick film base material can be easily prepared.

It is preferable that the fine cellulose fiber dispersion liquid contain the mixed solvent containing water and the water-soluble organic solvent, in terms of decreasing the drying energy. As the water-soluble organic solvent to be used, a low-molecular weight alcohol, such as methanol, ethanol, 1-propanol, or 2-propanol, or a ketone, such as acetone or methyl ethyl ketone, is particularly preferable, taking into account the cost or boiling point thereof. The formed cellulose film is expected to be applied to an insulating film or an electrolyte film of a fuel cell or a display part.

In the case where the fine cellulose fiber dispersion liquid contains the mixed solvent containing water and the alcohol, the dispersion medium hardly remains in the dried coating film, which results in a dense film, and therefore the mechanical strength and the water resistance of the film are improved.

(Laminate Body)

The fine cellulose fiber dispersion liquid may be coated on the base material by a conventionally-known coating process, such as, a gravure coating process, a reverse gravure coating process, a roll coating process, a reverse roll coating process, a microgravure coating process, a comma coating process, an air-knife coating process, a bar coating process, a Mayer bar coating process, a dip coating process, a die coating process, a spray coating process, a slit coating process, or a screen printing process, to form a laminate body.

The base material is not particularly limited, and may be arbitrarily selected as usage thereof from conventionally-used various base materials in a sheet form (including a film form). The base material may be made, for example, from a paper, a paper board, a biodegradable plastic, such as a polylactic acid or polybutyl succinate, a polyolefin-based resin (such as polyethylene or polypropylene), a polyester-based resin (such as polyethylene terephthalate, polybutyleneterephthalate or polyethylene naphthalate), a polyamide-based resin (such as nylon-6 or nylon-66), a polyvinyl chloride-based resin, a polyimide-based resin, or a copolymer of at least two of monomers forming the polymers. The base material may contain a conventionally-known additive agent such as an antistatic agent, an ultraviolet absorber, a plasticizer, a lubricant, or a coloring agent.

The base material, particularly, made from a paper, a biodegradable plastic such as polylactic acid or polybutyl succinate, or a biomass material such as bio-polyethylene, is preferably used, because advantages of the fine cellulose fiber derived from the natural product with a small environmental burden are maximally exhibited.

The surface of the base material may be subjected to surface treatment such as corona treatment, plasma treatment, ozone treatment, or frame treatment. The surface treatment further improves the wettability or the adhesiveness of the base material surface with respect to the layer to be laminated thereon (the layer having the fine cellulose fiber dispersion liquid). The surface treatment may be performed by a conventionally-known method.

The thickness of the base material may be arbitrarily determined as usage of the laminate body. In the case where the laminate body is used as a packing material, for example, the thickness thereof is generally 10 μm to 200 μm, preferably 10 μm to 100 μm.

A coating film of the fine cellulose fiber dispersion liquid is dried with an oven or the like, to form a coating film of the fine cellulose fiber on the base material. At the process, it is preferable that the fine cellulose fiber dispersion liquid contain a mixed solvent containing water, an alcohol, and the like, in order to decrease the surface tension of the coating film to improve the wettability thereof while preventing occurrence of eye holes at a coating process, as well as to reduce the drying energy thereof. In addition, the mechanical strength and the gas barrier property of the coating film are also improved, due to the same reasons as those mentioned above. The alcohol is preferably the low-molecular weight alcohol mentioned above.

The fine cellulose fiber dispersion liquid may be used as a bonding-, anchor-coating-, or primer-composition containing both the fine cellulose fiber and the organic solvent. In particular, the fine cellulose fiber dispersion liquid is used by coating on the base material such as polylactic acid to form a biomass film having an excellent coatability and adhesiveness with respect to the base material.

The fine cellulose fiber dispersion liquid may be used, for example, to form a film as an undercoat layer (first coating film layer), followed by laminating a functional material layer (second coating film layer) formed using a functional material, such as a gas-barrier material mentioned below, an ink, or the like, to form a functional laminate body having a high adhesiveness with respect to the base material. The functional material layer may be formed on the fine cellulose fiber film by the above-mentioned known coating or printing method.

In particular, in the case where the functional material layer is formed using a coating liquid containing the fine cellulose fiber, the functional material layer has a high affinity for the undercoat layer formed using the fine cellulose fiber dispersion liquid, has no eye hole, and exhibits a favorable adhesiveness with respect to the undercoat layer.

In addition, various functional material layers, such as a thermal adhesive thermoplastic resin layer, a printing layer, an adhesive layer, an antistatic layer, an antireflective layer, an antidazzle layer, a polarization layer, a phase-contrast layer, a scratch-resistant- or antifoulant-protection layer, a vapor-deposited layer, a gas barrier layer against oxygen or the like, a water vapor barrier layer, a drug barrier layer, an adsorbent layer, a catalyst layer, or the like, may be formed on the above-mentioned cellulose film or laminate body, as needed.

Among the functional material layers mentioned above, a vapor-deposited layer particularly has an effect of improving the gas barrier property.

Inorganic compounds for forming the vapor-deposited layer are not particularly limited, and ones conventionally used to form a vapor-deposited film of a gas barrier material or the like. Specific examples thereof include inorganic oxides such as aluminum oxide, magnesium oxide, silicon oxide, and tin oxide. The inorganic compounds may be used alone, or in combination of at least two types thereof.

The optimum thickness of the vapor-deposited layer varies depending on the type or composition of the inorganic compounds, and is arbitrarily selected from a range of several nm to 500 nm, preferably 5 to 300 nm, taking into account the desired gas barrier property, or the like, in general. If the thickness of the vapor-deposited layer is extremely thin, the sequentially of the vapor-deposited film is not maintained, while if the thickness thereof is extremely thick, the flexibility thereof is lowered, and thereby easily generating cracks, and therefore the gas barrier property of the vapor-deposited layer may not be sufficiently exhibited.

The vapor-deposited layer may be formed by a conventionally-known method such as a vacuum vapor deposition method, a sputtering method, a plasma vapor phase growth method (CVD method), or the like, alternatively or a commercially available film or sheet having a vapor-deposited layer formed thereon may be used as the base material.

Among the above-mentioned functional material layers, a thermal adhesive thermoplastic resin layer is useful as a packing material, because processing, sealing, or the like, can be done by heat-sealing. Examples of the thermal adhesive thermoplastic resin layer include polypropylene film such as unstretched polypropylene film (CPP), polyethylene film such as low-density polyethylene film (LDPE), or straight-chain low-density polyethylene film (LLDPE), and the like.

The thermoplastic resin layer is generally laminated on the cellulose film or the laminate body by extruding or using an adhesive agent layer therebetween.

EXAMPLES

Next, the present invention is described in more specific, based on a series of examples. However, the present invention is in no way limited by the examples.

(Preparation of Oxidized Cellulose)

A bleached pulp of a needle-leaved tree commonly available was used as a cellulose.

30 g of the cellulose (calculated in terms of the absolute dry mass thereof) was added to 600 g of distilled water and then stirred to be swollen, followed by fibrillating using a mixer. A solution composed of 1200 g of distilled water, 0.3 g of TEMPO previously dissolved in 200 g of distilled water, and 3 g of sodium bromide was added to the resultant, and 86 g of an aqueous solution containing 2 mol/L of sodium hypochlorite was added dropwise thereto to start oxidation reaction. The reaction temperature was always maintained at 20° C. or lower. Although the pH in the system during the reaction lowered, the pH was adjusted to 10 by gradually adding thereto an aqueous solution containing 0.5 N of NaOH. The reaction was stopped by adding 30 g of ethanol 3 hours after the reaction proceeded. Then, 0.5 N of HCl was added dropwise to the reaction liquid to lower the pH to 1.8. The reaction liquid was filtered using a nylon mesh, followed by washing the solid content using water several times to remove the reaction reagents or by-products, and thereby obtaining an oxidized cellulose containing water, the solid content concentration of the resultant being 7%.

(Measurement of the Introduction Amount of Functional Groups)

0.2 g of the moist oxidized cellulose, calculated in terms of the absolute dry mass thereof, was put into a beaker, and distilled water was added thereto to amount to 60 g. 0.5 mL of an aqueous solution containing 0.1 M of NaCl was added thereto, and the pH of the resultant was adjusted to 1.8 using 0.5 M of hydrochloric acid, followed by adding an aqueous solution containing 0.5 M of NaOH dropwise to measure the conductivity of the resultant. The measurement was continued until the pH of the resultant reached approximately 11. An additive amount of NaOH at the neutralization stage of the weak acid, which corresponded to the content of carboxyl groups, was read from the obtained conductivity curve to determine the content of carboxyl groups to be 1.6 mmol/g.

Next, 20 mL of 0.5 M acetic acid, 60 ml of distilled water, and 1.8 g of sodium chlorite were added to 2 g of the moist oxidized cellulose, calculated in terms of the absolute dry mass thereof, and the pH of the resultant was adjusted to 4, followed by allowing the reaction to proceed for 48 hours. Then, the content of carboxyl groups was measured as mentioned above, which revealed that the content thereof was 1.8 mmol/g. As a result, the content of aldehyde groups was calculated to be 0.2 mmol/g.

Example 1

Preparation of Fine Cellulose Fiber Dispersion Liquid

Distilled water was added to 57.14 g (4 g in terms of solid content) of the oxidized cellulose prepared as mentioned above, the oxidized cellulose having a solid content concentration of 7%, to obtain 400 g of an oxidized cellulose suspension. The pH of the resultant was adjusted to 8 using 10% by weight of tetraethyl ammonium hydroxide (TEAH manufactured by Kanto Kagaku Co., Ltd.). The thus prepared dispersion liquid was treated with a mixer equipped with a rotary blade for 60 minutes, to obtain a fine cellulose fiber dispersion liquid.

Example 2

Preparation of Fine Cellulose Fiber Dispersion Liquid 199 g of ethanol (EtOH) and distilled water were added to 28.57 g (2 g in terms of solid content) of the oxidized cellulose prepared as mentioned above, the oxidized cellulose having a solid content concentration of 7%, to obtain 400 g of an oxidized cellulose suspension. The pH of the resultant was adjusted to 8 using 10% by weight of tetraethyl ammonium hydroxide. The thus prepared dispersion liquid was treated with a mixer equipped with a rotary blade for 60 minutes, to obtain a fine cellulose fiber dispersion liquid.

Comparative Example 1

Preparation of Fine Cellulose Fiber Dispersion Liquid

Distilled water was added to 57.14 g (4 g in terms of solid content) of the oxidized cellulose prepared as mentioned above, the oxidized cellulose having a solid content concentration of 7%, to obtain 400 g of an oxidized cellulose suspension. The pH of the resultant was adjusted to 8 using an aqueous solution of sodium hydroxide (NaOH). The thus prepared dispersion liquid was treated with a mixer equipped with a rotary blade for 60 minutes, to obtain a fine cellulose fiber dispersion liquid.

Comparative Example 2

Preparation of Fine Cellulose Fiber Dispersion Liquid 199 g of ethanol and distilled water were added to 28.57 g (2 g in terms of solid content) of the oxidized cellulose prepared as mentioned above, the oxidized cellulose having a solid content concentration of 7%, to obtain 400 g of an oxidized cellulose suspension. The pH of the resultant was adjusted to 8 using an aqueous solution of sodium hydroxide. The thus prepared dispersion liquid was treated with a mixer equipped with a rotary blade for 60 minutes.

(Measurement of Transmittance of the Fine Cellulose Fiber Dispersion Liquid)

The fine cellulose fiber dispersion liquids prepared in Examples 1 and 2 and Comparative Examples 1 and 2 were compared in terms of the transparency thereof by measuring the transmittance thereof at 660 nm using a spectrophotometer.

(Cellulose Film)

The fine cellulose fiber dispersion liquids prepared in Examples 1 and 2 and Comparative Examples 1 and 2 were poured into square plastic containers, and then dried at 50° C. overnight, followed by drying at 120° C. for 1 hour to obtain cellulose films.

(Measurement of the Content of Sodium Ions)

The contents of sodium ions in the cellulose films were measured by an EPMA method using an X-RAY micro analyzer.

(Swelling Test)

The cellulose films were subjected to the swelling test (N=2), respectively, by immersing the cellulose films in distilled water for 1 minute to compare values of the weight thereof before and after the immersion.

The transmittance of the fine cellulose fiber dispersion liquids prepared in Examples 1 and 2 and Comparative Examples 1 and 2, the sodium ion content in the cellulose films, and the results of the swelling test are shown in Table 1.

TABLE 1

|  | Example 1 | Example 2 | Comparative Example 1 | Comparative Example 2 |
|---|---|---|---|---|
| Alkali species | TEAH | TEAH | NaOH | NaOH |
| Dispersion medium | Water | Water/EtOH | Water | Water/EtOH |
| Solid content concentration (%) | 1 | 0.5 | 1 | 0.5 |
| pH | 8 | 8 | 8 | 8 |
| Transmittance (%) | 86.0 | 73.0 | 83.0 | 0.4 |
| Na content (wt %) | Below measurable limits | Below measurable limits | 9.2 | 7.0 |
| Swelling property Weight change (fold) | 17.5 | 13.5 | 24.3 | Deterioration |

The transmittance of the fine cellulose fiber dispersion liquids prepared in Examples 1 and 2 and Comparative Example 1 was at least 70%, while the fine cellulose fiber dispersion liquid prepared in Comparative Example 2 was scarcely dispersed and maintained to be clouded.

No sodium ion was detected from the cellulose films prepared in Examples 1 and 2 using the organic alkali.

The cellulose films prepared in Examples 1 and 2 exhibited an improved swelling-resistance against water and a superior water resistance in comparison with those prepared in the comparative examples. In particular, the change in weight due to swelling was further suppressed in Example 2 in which ethanol was formulated in the dispersion medium.

Example 3

Preparation of Fine Cellulose Fiber Dispersion Liquid

Distilled water and 10% by weight of tetramethyl ammonium hydroxide (TMAH manufactured by Kanto Kagaku Co., Ltd) were added to 28.57 g (2 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid.

Example 4

Preparation of Fine Cellulose Fiber Dispersion Liquid

Distilled water and 10% by weight of tetraethyl ammonium hydroxide were added to 28.57 g (2 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid.

Example 5

Preparation of Fine Cellulose Fiber Dispersion Liquid

Distilled water and 0.4 mol/l of tetra-n-butyl ammonium hydroxide (TBAH manufactured by Kanto Kagaku Co., Ltd.) were added to 28.57 g (2 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid.

Example 6

Preparation of Fine Cellulose Fiber Dispersion Liquid

Distilled water and 10% by weight of tetraethyl ammonium hydroxide were added to 114.29 g (8 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid.

Example 7

Preparation of Fine Cellulose Fiber Dispersion Liquid 199 g of ethanol, distilled water, and 10% by weight of tetraethyl ammonium hydroxide were added to 28.57 g (2 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid.

Comparative Example 3

Preparation of Fine Cellulose Fiber Dispersion Liquid

Distilled water and an aqueous solution containing 0.5 N of sodium hydroxide were added to 28.57 g (2 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid.

Comparative Example 4

Preparation of Fine Cellulose Fiber Dispersion Liquid

Distilled water and an aqueous solution containing 0.5 N of sodium hydroxide were added to 114.29 g (8 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid.

Comparative Example 5

Preparation of Fine Cellulose Fiber Dispersion Liquid 199 g of ethanol, distilled water, and an aqueous solution containing 0.5 N of sodium hydroxide were added to 28.57 g (2 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid.

(Measurement of Transmittance of the Fine Cellulose Fiber Dispersion Liquid)

The fine cellulose fiber dispersion liquids prepared in Examples 3 to 7 and Comparative Examples 3 to 5 were compared in terms of the transparency thereof by measuring the transmittance thereof at 660 nm using a spectrophotometer.

(Measurement of Viscosity of the Fine Cellulose Fiber Dispersion Liquid)

The shear viscosity of the fine cellulose fiber dispersion liquids prepared in Examples 3 to 7 and Comparative Examples 3 to 5 was measured by a rheometer (MARS manufactured by HAAKE Company) using a cone-plate under conditions of an inclination angle of 1° and a cone diameter of 35 mm. The shear viscosity was continuously measured for shear rates of 0.01 to 100 $s^{-1}$ while maintaining the measurement site at 23° C., and the value of the shear viscosity at the shear rate of 1 $s^{-1}$ was determined. In addition, Ti values of the fine cellulose fiber dispersion liquids prepared in Examples 3 to 5 and Comparative Example 3 were determined as ratios $\eta 1\ s^{-1}/\eta 10\ s^{-1}$ of the shear viscosity at the shear rate of 1 $s^{-1}$ relative to the shear viscosity at the shear rate of 10 $s^{-1}$.

(Measurement of Contact Angle of the Fine Cellulose Fiber Dispersion Liquid)

The contact angles of the fine cellulose fiber dispersion liquids prepared in Examples 3 to 7 and Comparative Examples 3 to 5 relative to the PET film base material (12 μm thickness, corona-treated surface) were measured using an automatic contact angle meter (CA-V type manufactured by Kyowa Interface Science Co., Ltd.). The measurement was performed by a drop method, and the contact angles were measured 20 seconds after drop-deposition.

(Cellulose Film)

The fine cellulose fiber dispersion liquids prepared in Examples 3 to 7 and Comparative Examples 3 to 5 were poured into square plastic containers, and then dried at 50° C. overnight, followed by drying at 120° C. for 1 hour to obtain cellulose films.

(Measurement of the Content of Sodium Ions)

The contents of sodium ions in the cellulose films were measured by an EPMA method using an X-RAY micro analyzer.

The transmittance of the fine cellulose fiber dispersion liquids prepared in Examples 3 to 7 and Comparative Examples 3 to 5, the shear stress thereof, the Ti values thereof, the contact angle thereof, and the sodium content of the cellulose films are shown in Table 2.

TABLE 2

| | Example 3 | Example 4 | Example 5 | Example 6 | Example 7 | Comparative Example 3 | Comparative Example 4 | Comparative Example 5 |
|---|---|---|---|---|---|---|---|---|
| Alkali species | TMAH | TEAH | TBAH | TEAH | TEAH | NaOH | NaOH | NaOH |
| Dispersion medium | Water | Water | Water | Water | Water/EtOH | Water | Water | Water/EtOH |
| Solid content concentration (%) | 0.5 | 0.5 | 0.5 | 2 | 0.5 | 0.5 | 2 | 0.5 |
| pH | 10 | 10 | 10 | 10 | 10 | 10 | 10 | 10 |
| Transmittance (%) | 98.6 | 98.8 | 99.0 | 81.7 | 73.0 | 95.7 | 55.9 | 0.4 |
| Shear viscosity ($s^{-1}$) | 1.277 | 0.855 | 0.0873 | 6.106 | 2.893 | 3.165 | 56.98 | 1.355 |
| Ti value | 5.35 | 4.46 | 3.39 | 5.82 | 4.32 | 8.02 | 8.12 | 2.6 |
| Contact angle (°) | 62.4 | 60.4 | 59.7 | 65.2 | 34.1 | 61.3 | 85.2 | 20.5 |
| Na content (wt %) | Below measurable limits | Below measurable limits | Below measurable limits | Below measurable limits | Below measurable limits | 9.1 | 7.9 | 8.2 |

The transmittance of the fine cellulose fiber dispersion liquids prepared in Examples 3 to 7 is larger than that of the fine cellulose fiber dispersion liquids prepared in Comparative Examples 3 to 5. On the other hand, the fine cellulose fiber dispersion liquids prepared in Comparative Examples 4 and 5 were not sufficiently dispersed and maintained to be clouded. The fine cellulose fiber dispersion liquids prepared using the organic alkali exhibited a reduced viscosity and thixotropic properties. In the case where the alcohol was used in the dispersion medium, the contact angle relative to the base material decreased, and thereby improving the wettability. In the cellulose films prepared in Examples 3 to 7 in which the dispersion treatment was performed using the organic alkali, no sodium ions were detected.

Next, Examples 8 to 11 and Comparative Examples 6 to 9 will be explained.

(Preparation of Oxidized Cellulose)

A bleached pulp of a needle-leaved tree commonly available was used as a cellulose.

60 g of the cellulose (calculated in terms of the absolute dry mass thereof) was added to 1000 g of distilled water and then stirred to be swollen, followed by fibrillating using a mixer. A solution composed of 2200 g of distilled water, 0.6 g of TEMPO previously dissolved in 400 g of distilled water, and 6 g of sodium bromide was added to the resultant, and 172 g of an aqueous solution containing 2 mol/L of sodium hypochlorite was added dropwise thereto to start oxidation reaction. The reaction temperature was always maintained at 30° C. or lower. Although the pH in the system during the reaction lowered, the pH was maintained at 10 by gradually adding thereto an aqueous solution containing 0.5 N of NaOH. The reaction was allowed to proceed for 4 hours while monitoring the addition amount of the NaOH aqueous solution, followed by making the reaction stop by adding 60 g of ethanol. Then, 0.5 N of HCl was added dropwise to the reaction liquid to lower the pH to 1.8. The reaction liquid was filtered using a nylon mesh, followed by washing the solid content thereof with water several times to remove the reaction reagents or by-products, and thereby obtaining an oxidized cellulose containing water, the solid content concentration of the resultant being 7%.

(Measurement of the Introduction Amount of Functional Groups)

0.2 g of the moist oxidized cellulose, calculated in terms of the absolute dry mass thereof, was put into a beaker, and distilled water was added thereto to amount to 60 g. 0.5 mL of an aqueous solution containing 0.1 M of NaCl was added thereto, and the pH of the resultant was adjusted to 1.8 using 0.5 M of hydrochloric acid, followed by adding an aqueous solution containing 0.5 M of NaOH dropwise to measure the conductivity of the resultant. The measurement was continued until the pH of the resultant reached approximately 11. An additive amount of NaOH at the neutralization stage of the weak acid, which corresponded to the content of carboxyl groups, was read from the obtained conductivity curve to determine the content of carboxyl groups to be 2.0 mmol/g.

Next, 20 mL of 0.5 M acetic acid, 60 ml of distilled water, and 1.8 g of sodium chlorite were added to 2 g of the moist oxidized cellulose, calculated in terms of the absolute dry mass thereof, and the pH of the resultant was adjusted to 4, followed by allowing the reaction to proceed for 48 hours. Then, the content of carboxyl groups was measured as mentioned above, which revealed that the content thereof was 2.1 mmol/g. As a result, the content of aldehyde groups was calculated to be 0.1 mmol/g.

Example 8

Preparation of Fine Cellulose Fiber Dispersion Liquid

Distilled water and 10% by weight of tetraethyl ammonium hydroxide (TEAH manufactured by Kanto Kagaku Co., Ltd) were added to 57.14 g (4 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid. 9.95 g of methanol and 0.05 g of distilled water were added to 10 g of the thus prepared fine cellulose fiber dispersion liquid, followed by stirring to obtain a fine cellulose fiber dispersion liquid having a solid content concentration of 0.5%.

Example 9

A fine cellulose fiber dispersion liquid was prepared in a similar manner to that of Example 8, except that ethanol was used instead of methanol.

Example 10

A fine cellulose fiber dispersion liquid was prepared in a similar manner to that of Example 8, except that 2-propanol (IPA) was used instead of methanol.

Example 11

A fine cellulose fiber dispersion liquid was prepared in a similar manner to that of Example 8, except that acetone was used instead of methanol.

Comparative Example 6

Preparation of Fine Cellulose Fiber Dispersion Liquid

Distilled water and an aqueous solution containing 0.5 N sodium hydroxide (NaOH) were added to 57.14 g (4 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid. 9.95 g of methanol and 0.05 g of distilled water were added to 10 g of the thus prepared fine cellulose fiber dispersion liquid, followed by stirring to obtain a fine cellulose fiber dispersion liquid having a solid content concentration of 0.5%.

Comparative Example 7

A fine cellulose fiber dispersion liquid was prepared in a similar manner to that of Comparative Example 6, except that ethanol was used instead of methanol.

Comparative Example 8

A fine cellulose fiber dispersion liquid was prepared in a similar manner to that of Comparative Example 6, except that 2-propanol (IPA) was used instead of methanol.

Comparative Example 9

A fine cellulose fiber dispersion liquid was prepared in a similar manner to that of Comparative Example 6, except that acetone was used instead of methanol.

(Measurement of Transmittance of the Fine Cellulose Fiber Dispersion Liquid)

The fine cellulose fiber dispersion liquids prepared in Examples 8 to 11 and Comparative Examples 6 to 9 were compared in terms of the transparency thereof by measuring the transmittance thereof at 660 nm using a spectrophotometer. The measurement results are shown in Table 3.

TABLE 3

| | Example 8 | Example 9 | Example 10 | Example 11 | Comparative Example 6 | Comparative Example 7 | Comparative Example 8 | Comparative Example 9 |
|---|---|---|---|---|---|---|---|---|
| Alkali species | TEAH | TEAH | TEAH | TEAH | NaOH | NaOH | NaOH | NaOH |
| Water-based medium | Water | Water | Water | Water | Water | Water | Water | Water |
| Water-soluble organic solvent | Methanol | Ethanol | IPA | Aceton | Methanol | Ethanol | IPA | Aceton |
| Solid content concentration (%) | 0.5 | 0.5 | 0.5 | 0.5 | 0.5 | 0.5 | 0.5 | 0.5 |
| pH | 10 | 10 | 10 | 10 | 10 | 10 | 10 | 10 |
| Transmittance (%) | 98.6 | 99.3 | 99.2 | 98.2 | 96.0 | 81.7 | 81.6 | 77.0 |

In the fine cellulose fiber dispersion liquid prepared in Examples 8 to 11, agglomeration and white turbidity were not visually observed and the transmittance thereof was not decreased, without depending on the solvent added. On the other hand, when ethanol, 2-propanol, or acetone, was added in the fine cellulose fiber dispersion liquid prepared in Comparative Examples 6 to 9, agglomeration and white turbidity were visually observed, which made the dispersion liquid heterogeneous, and thereby deteriorating the transmittance thereof. In other words, in the case where sodium hydroxide was used as an alkali, the addition of the water-soluble organic solvent to the prepared fine cellulose fiber dispersion liquid made the dispersed fine cellulose fibers agglomerate, and thereby generating agglomeration and white turbidity in the fine cellulose fiber dispersion liquid, and making the fine cellulose fiber dispersion liquid heterogeneous.

Next, Examples 12 to 15 and Comparative Examples 10 and 11 will be explained.

(Preparation of Oxidized Cellulose)

A bleached pulp of a needle-leaved tree commonly available was used as a cellulose.

60 g of the cellulose (calculated in terms of the absolute dry mass thereof) was added to 1000 g of distilled water and then stirred to be swollen, followed by fibrillating using a mixer. A solution composed of 2200 g of distilled water, 0.6 g of TEMPO previously dissolved in 400 g of distilled water, and 6 g of sodium bromide was added to the resultant, and 172 g of an aqueous solution containing 2 mol/L of sodium hypochlorite was added dropwise thereto to start oxidation reaction. The reaction temperature was always maintained at 20° C. or lower. Although the pH in the system during the reaction lowered, the pH was maintained at 10 by gradually adding thereto an aqueous solution containing 0.5 N of NaOH. The reaction was allowed to proceed while monitoring the additive amount of the NaOH aqueous solution for 4 hours, followed by making the reaction stop by adding 60 g of ethanol. Then, 0.5 N of HCL was added dropwise to the reaction liquid to lower the pH to 1.8. The reaction liquid was filtered using a nylon mesh, followed by washing the solid content thereof with water several times to remove the reaction reagents or by-products, and thereby obtaining an oxidized cellulose containing water, the solid content concentration of the resultant being 7%.

(Measurement of the Introduction Amount of Functional Groups)

0.2 g of the moist oxidized cellulose, calculated in terms of the absolute dry mass thereof, was put into a beaker, and distilled water was added thereto to amount to 60 g. 0.5 mL of an aqueous solution containing 0.1 M of NaCl was added thereto, and the pH of the resultant was adjusted to 1.8 using 0.5 M of hydrochloric acid, followed by adding an aqueous solution containing 0.5 M of NaOH dropwise to measure the conductivity of the resultant. The measurement was continued until the pH of the resultant reached approximately 11. An additive amount of NaOH at the neutralization stage of the weak acid, which corresponded to the content of carboxyl groups, was read from the obtained conductivity curve to determine the content of carboxyl groups to be 2.0 mmol/g.

Next, 20 mL of 0.5 M acetic acid, 60 ml of distilled water, and 1.8 g of sodium chlorite were added to 2 g of the moist oxidized cellulose, calculated in terms of the absolute dry mass thereof, and the pH of the resultant was adjusted to 4, followed by allowing the reaction to proceed for 48 hours. Then, the content of carboxyl groups was measured as mentioned above, which revealed that the content thereof was 2.1 mmol/g. As a result, the content of aldehyde groups was calculated to be 0.1 mmol/g.

Example 12

Preparation of Fine Cellulose Fiber Dispersion Liquid

Distilled water and 10% by weight of tetraethyl ammonium hydroxide (TEAH manufactured by Kanto Kagaku Co., Ltd) were added to 57.14 g (4 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid. 9.95 g of acetone and 0.05 g of distilled water were added to 10 g of the thus prepared fine cellulose fiber dispersion liquid, followed by stirring to obtain a fine cellulose fiber dispersion liquid having a solid content concentration of 0.5%.

Example 13

Distilled water and 10% by weight by weight of tetrabutylphosphonium hydroxide (TBPH manufactured by Kanto Kagaku Co., Ltd.) were added to 57.14 g (4 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid. 9.95 g of acetone and 0.05 g of distilled water were added to 10 g of the thus prepared fine cellulose fiber dispersion liquid, followed by stirring to obtain a fine cellulose fiber dispersion liquid having a solid content concentration of 0.5%.

Example 14

Distilled water and 0.1 N of ammonia aqueous solution were added to 57.14 g (4 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid. 0.1 g of a water-soluble polycarbodiimide SV-02 (manufactured by Nisshinbo Industries, Inc.) was added to 10 g of the thus prepared fine cellulose fiber dispersion liquid. 9.95 g of acetone and 0.05 g of distilled water were added to the resultant, followed by stirring to obtain a fine cellulose fiber dispersion liquid having a solid content concentration of 0.5%.

Example 15

Distilled water and 0.1 N of ammonia aqueous solution were added to 57.14 g (4 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid. 0.05 g of EPOCROS WS-500 (manufactured by Nippon Shokubai Co., Ltd.) was added to 10 g of the thus prepared fine cellulose fiber dispersion liquid. 9.95 g of acetone and 0.05 g of distilled water were added to the resultant, followed by stirring to obtain a fine cellulose fiber dispersion liquid having a solid content concentration of 0.5%.

(Preparation of Laminate Body)

Polylactic acid (PLA) films, each having a film thickness of 25 μm, the surface of which being subjected to plasma treatment, were used as base materials. The fine cellulose fiber dispersion liquids prepared in Examples 12 to 15 were each coated on the plasma-treated surfaces of the base materials using a bar coarter, followed by drying at 70° C. for 20 minutes to obtain films (first coating film layers), each having a film thickness of approximately 200 nm. On the first coating film layer as an undercoat layer, a gas-barrier material was coated with a bar coarter. As the gas-barrier material, a coating liquid containing a known fine cellulose fiber was used. After the coating, the resultant was dried at 70° C. for 30 minutes to form a gas barrier layer (second coating film layer) having a film thickness of approximately 0.5 μm.

In addition, a polypropylene (PP) film with a film thickness of 70 μm was bonded on the gas barrier layer using an urethane polyol-based adhesive agent by a dry laminate procedure to obtain a four-layered laminate body including the first coating film layer and the second coating film layer containing the gas-barrier material.

Comparative Example 10

Preparation of Fine Cellulose Fiber Dispersion Liquid

Distilled water and an aqueous solution containing 0.5 N of sodium hydroxide (NaOH) were added to 57.14 g (4 g in terms of solid content) of the oxidized cellulose prepared as mentioned above, the oxidized cellulose having a solid content concentration of 7%, to obtain 400 g of an oxidized cellulose suspension having a pH of 10. The thus prepared suspension was treated with a mixer equipped with a rotary blade for 60 minutes, to obtain a fine cellulose fiber dispersion liquid. 9.95 g of acetone and 0.05 g of distilled water were added to 10 g of the thus prepared fine cellulose fiber dispersion liquid, followed by stirring to obtain a fine cellulose fiber dispersion liquid having a solid content concentration of 0.5%.

(Preparation of Laminate Body)

A four-layered laminate body containing a first coating film layer formed using the fine cellulose fiber dispersion liquid and a second coating film layer containing a gas-barrier material was prepared using the obtained fine cellulose fiber dispersion liquid in a similar manner to that of Examples 12 to 15.

Comparative Example 11

Preparation of Laminate Body

A polylactic acid (PLA) film having a film thickness of 25 μm, the surface of which was subjected to plasma treatment, was used as a base material. The same gas-barrier material as that used in Example 12 was coated on the plasma-treated surface of the base material using a bar coarter, followed by drying at 70° C. for 30 minutes to form a gas barrier layer having a film thickness of approximately 0.5 μm.

In addition, a polypropylene (PP) film with a film thickness of 70 μm was bonded on the gas barrier layer using an urethane polyol-based adhesive agent by a dry laminate procedure to obtain a three-layered laminate body including the gas-barrier layer.

(Measurement of Transmittance)

The fine cellulose fiber dispersion liquids prepared in Examples 12 to 15 and Comparative Example 10 were compared in terms of the transparency thereof by measuring the transmittance thereof at 660 nm using a spectrophotometer. The measurement results are shown in Table 4.

<Evaluation of Wettability>

The laminate bodies prepared in Examples 12 to 15 and Comparative Example were visually evaluated in terms of the wettability when the fine cellulose fiber dispersion liquid was coated on the PLA base material, and also the laminate bodies prepared in Examples 12 to 15 and Comparative Examples 10 and 11 were visually evaluated in terms of the wettability when the gas-barrier material was coated on the undercoat layer. The evaluation results are shown in Table 4.

<Evaluation of Adhesiveness>

With respect to the laminate bodies prepared in Examples 12 to 15 and Comparative Example 10, the film formed using the fine cellulose fiber dispersion liquid on the base material was cut into a grid form composed of 10 vertical stripes and 10 horizontal stripes (with each interval of 1 mm, total 100 cuts) using a cross cut guide "CCJ-1" (manufactured by Cotec Co., Ltd.), followed by attaching thereon SELLOTAPE (trademark) (CT 24 manufactured by Nichiban Co., Ltd.) to perform a peeling test. After the peeling, the number of the cuts remaining on the base material surface without peeling therefrom (the number of remaining cuts/100) was counted. The evaluation results are shown in Table 4.

<Measurement of Adhesion Strength>

Each laminate body prepared in Examples 12 to 15 and Comparative Examples and 11 was cut in a rectangle having a width of 15 mm and a length of 10 cm to obtain a test specimen. The test specimen was subjected to T-shaped peel test at a peeling rate of 300 mm/min to measure the adhesion strength (N/15 mm) between the base material and the PP film in accordance with JIS-K-7127. The obtained measurement results are shown in Table 4.

TABLE 4

|  |  | Example 12 | Example 13 | Example 14 | Example 15 | Comparative Example 10 | Comparative Example 11 |
|---|---|---|---|---|---|---|---|
| Undercoat layer (Fine cellulose fiber dispersion liquid) | Base material | PLA | PLA | PLA | PLA | PLA | PLA |
|  | Alkali species | TEAH | TBPH | Ammonia | Ammonia | NaOH | — |
|  | Water-based medium | Water | Water | Water | Water | Water | — |
|  | Other additives | Absence | Absence | SV-02 | WS500 | Absence | — |
|  | Organic solvent | Acetone | Acetone | Acetone | Acetone | Acetone | — |
|  | Solid content concentration (wt %) | 0.5 | 0.5 | 0.5 | 0.5 | 0.5 | — |
|  | pH | 10 | 10 | 10 | 10 | 10 | — |
| Evaluation | Transmittance (%) | 98 | 97 | 97 | 97 | 77 | — |
|  | Wettability | ○ | ○ | ○ | ○ | x | — |
|  | Adhesiveness | 70/100 | 70/100 | 100/100 | 100/100 | 0/100 | — |
| Functional material layer (gas-barrier material) | Evaluation Wettability | ○ | ○ | ○ | ○ | x | x |
|  | Adhesion strength (N) | 0.2 | 0.2 | 1.2 | 2.5 | 0 | 0 |

As shown in Table 4, in Examples 12 to 15, the fine cellulose fiber dispersion liquid and the organic solvent were uniformly mixed to obtain the fine cellulose fiber dispersion liquid having a high transparency. In addition, the undercoat layer (first coating film layer) formed on the base material using the thus obtained fine cellulose fiber dispersion liquid had a high wettability with respect to the base material and had no eye hole. In addition, the adhesiveness of the undercoat layer to the base material was improved. In addition, the functional material layer (second coating film layer) containing the gas-barrier material had also a high wettability with respect to the undercoat layer and exhibited a high adhesion strength, and thereby improving the coatability thereof.

On the other hand, in Comparative Examples 10 and 11, the wettability with respect to the base material was low and no homogeneous coating film was formed. Thus, it has been demonstrated that the fine cellulose fiber dispersion liquid according to the present invention is excellent in the transmittance, the wettability, the adhesiveness, and the adhesion strength, and allows to form various functional material coating film, such as a gas barrier layer or a water vapor barrier layer, on the base material, with favorable coatability and adhesiveness. Accordingly, the use of the fine cellulose fiber dispersion liquid prepared by the manufacturing method of the fine cellulose fiber dispersion liquid according to the present invention makes it possible to provide a mechanically stable laminate body having an improved adhesiveness for the base material.

The present invention is not limited to the above-shown examples, and may be variously modified without departing from the spirit of the present invention.

The invention claimed is:

1. A method of manufacturing a fine cellulose fiber dispersion liquid, comprising:
   an oxidation process in which a cellulose is subjected to an oxidation treatment to obtain an oxidized cellulose having a carboxyl group; and
   a dispersion process in which the oxidized cellulose obtained in the oxidation process is subjected to a dispersion treatment in a water-based medium in which a pH thereof is adjusted to greater than 7 to 12 using either an ammonia water or an organic alkali to obtain the fine cellulose fiber dispersion liquid.

2. The method according to claim 1, wherein the organic alkali is either an amine or an organic onium compound comprising a hydroxide ion as a counter ion.

3. The method according to claim 1, wherein the organic alkali is a quaternary ammonium compound having a hydroxide ion as a counter ion.

4. The method according to claim 1, wherein
   the water-based medium is either water or a mixed liquid comprising water and an alcohol, and
   the alcohol is methanol, ethanol, 1-propanol, 2-propanol, 1-butanol, or 2-butanol.

5. The method according to claim 1, wherein
   the fine cellulose fiber dispersion comprises a water-soluble organic solvent, and
   the water-soluble organic solvent is at least one organic solvent selected from the group consisting of methanol, ethanol, 2-propanol, acetone, methyl ethyl ketone, 1,4-dioxane, tetrahydrofuran, N,N-dimethylformamide, N,N-dimethylacetamide, dimethylsulfoxide, acetonitrile, and ethyl acetate.

6. The method according to claim 1, further comprising:
   a preparation process to be performed after the dispersion process by adding a water-soluble organic solvent to the obtained fine cellulose fiber dispersion liquid, the water-soluble organic solvent being at least one organic solvent selected from the group consisting of methanol, ethanol, 2-propanol, acetone, methyl ethyl ketone, 1,4-dioxane, tetrahydrofuran, N,N-dimethylformamide, N,N-dimethylacetamide, dimethylsulfoxide, acetonitrile, and ethyl acetate.

7. The method according to claim 1, wherein
   in the dispersion process, the pH is adjusted to 8 to 12.

* * * * *

UNITED STATES PATENT AND TRADEMARK OFFICE
CERTIFICATE OF CORRECTION

PATENT NO. : 9,850,352 B2
APPLICATION NO. : 15/342510
DATED : December 26, 2017
INVENTOR(S) : Akiko Saiki et al.

Page 1 of 1

It is certified that error appears in the above-identified patent and that said Letters Patent is hereby corrected as shown below:

In the Specification

Column 1, Line 11:
After "of" delete "0".

Column 1, Line 19:
Before "by" delete "5".

In the Claims

Column 30, Line 6:
In Claim 1, delete "group:" and insert -- group; --, therefore.

Signed and Sealed this
Fifth Day of June, 2018

Andrei Iancu
*Director of the United States Patent and Trademark Office*